United States Patent
Krishna

(10) Patent No.: US 9,699,152 B2
(45) Date of Patent: Jul. 4, 2017

(54) SHARING CONTENT WITH PERMISSION CONTROL USING NEAR FIELD COMMUNICATION

(71) Applicant: Microsoft Technology Licensing, LLC, Redmond, WA (US)

(72) Inventor: Om Krishna, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 199 days.

(21) Appl. No.: 14/470,560

(22) Filed: Aug. 27, 2014

(65) Prior Publication Data
US 2016/0065546 A1 Mar. 3, 2016

(51) Int. Cl.
| | |
|---|---|
| G06F 17/30 | (2006.01) |
| H04L 29/06 | (2006.01) |
| G06F 21/62 | (2013.01) |
| H04W 4/00 | (2009.01) |
| H04W 12/08 | (2009.01) |
| G06F 17/22 | (2006.01) |
| H04L 12/58 | (2006.01) |

(52) U.S. Cl.
CPC ...... *H04L 63/0492* (2013.01); *G06F 17/2235* (2013.01); *G06F 17/30014* (2013.01); *G06F 21/6218* (2013.01); *H04L 51/046* (2013.01); *H04L 63/10* (2013.01); *H04W 4/008* (2013.01); *H04W 12/08* (2013.01)

(58) Field of Classification Search
CPC . H04L 63/0492; H04L 63/10; G06F 17/2235; G06F 17/30014; G06F 17/30165; G06F 21/6218; H04W 4/008; H04W 12/08
USPC ........................................ 707/705, 736, 828
See application file for complete search history.

(56) References Cited

U.S. PATENT DOCUMENTS 8,924,863 B2* 12/2014 Zawacki ........... G06F 17/30873
715/753
9,129,125 B2* 9/2015 Wang ................ G06F 21/6209
(Continued)

FOREIGN PATENT DOCUMENTS

| WO | 2012074365 A1 | 6/2012 |
|---|---|---|
| WO | WO 2013/036471 A2 | 3/2013 |

OTHER PUBLICATIONS

Second Written Opinion for International Patent Application No. PCT/US2015/04684, date of mailing: Apr. 26, 2016, date of filing: Aug. 26, 2015, 8 pages.
(Continued)

*Primary Examiner* — Hares Jami
(74) *Attorney, Agent, or Firm* — Christopher J. Volkmann; Kelly, Holt & Christenson, PLLC

(57) ABSTRACT

A sending device receives a user input indicating that the user wishes to share and open item of content with a receiving device. A near field communication link is opened between the sending device and the receiving device. Metadata for sharing the open data is gathered on the sending device and a permission setting user interface display is displayed, with the user input mechanism that allows a user to set permissions corresponding to the open item. User actuation of the permission setting user input mechanism is received, the permissions are added to the open item, and the metadata is sent to the receiving device over the near field communication link. The metadata includes a location of the open item. The open item can then be accessed by the receiving device, with the permissions applied to the open item.

16 Claims, 13 Drawing Sheets

(56) References Cited

U.S. PATENT DOCUMENTS

| | | | |
|---|---|---|---|
| 2004/0158586 A1 | 8/2004 | Tsai | |
| 2006/0075071 A1* | 4/2006 | Gillette | G06F 17/30067 709/219 |
| 2007/0213082 A1* | 9/2007 | Ryu | G06F 17/30041 455/466 |
| 2008/0016164 A1* | 1/2008 | Chandra | G06F 17/30899 709/206 |
| 2009/0327447 A1* | 12/2009 | Noll | H04L 63/101 709/216 |
| 2010/0083135 A1 | 4/2010 | Zawacki et al. | |
| 2012/0246226 A1* | 9/2012 | Anandam | H04L 67/06 709/203 |
| 2012/0278281 A1* | 11/2012 | Meisels | G06Q 10/107 707/625 |
| 2012/0284344 A1* | 11/2012 | Costenaro | G06F 17/241 709/206 |
| 2013/0225080 A1* | 8/2013 | Doss | H04L 63/10 455/41.2 |
| 2013/0332856 A1* | 12/2013 | Sanders | G06F 3/0481 715/753 |
| 2014/0149529 A1* | 5/2014 | Mclellan | H04L 67/1097 709/213 |
| 2014/0195516 A1 | 7/2014 | Balakrishnan et al. | |
| 2014/0359069 A1* | 12/2014 | Matute | H04W 12/08 709/218 |

OTHER PUBLICATIONS

Conner, Nancy: "Google Apps: The Missing Manual (Chapters 1-3)", May 1, 2008, 215 pages.

Sureswaran, et al., "Scalable and Reliable Multi Session Document Sharing System", In Proceedings of International Conference on Information and Communication Technologies: From Theory to Applications, Apr. 19, 2004, 6 pages.

Curts, Eric, "The Paperless Classroom with Google Does", Retrieved on: Jun. 23, 2014, Available at: https://docs.google.com/document/d/1fzwQSQbMKtBYJawRzjs0NrLN0QQnTPV-rlzc5_N4IEU/edit.

Ng, Simon, "Adding AirDrop File Sharing Feature to Your iOS Apps", Published on: Oct. 30, 2013, Available at: http://www.appcoda.com/ios7-airdrop-programming-tutorial/.

"How to Share Notes and Notebooks". Retrieved on: Jun. 23, 2014, Available at: http://evernote.com/contact/support/kb/#!/article/24973036.

Paisano Carta, Doriano, "5 Ways to Collaborate on Documents Online in Real Time", Published on: Feb. 21, 2009, Available at: http://mashable.com/2009/02/21/online-document-collaboration/.

"Collaborate with others in a PDF", Published on: Mar. 7, 2013, Available at: http://help.adobe.com/en_US/acrobat/X/pro/using/WS82A77713-15D7-48f4-9B19-3605F3A0AF5F.html.

"What is DirectReader?", Published on: Apr. 18, 2013, Available at: http://www.directreader.com/?m=features.

"Google Apps for Business", Retrieved on: Jun. 23, 2014, Available at: http://www.google.com/enterprise/apps/business/products.html.

International Search Report and Written Opinion for International Application No. PCT/US2015/046834, date of mailing: Nov. 11, 2015, date of filing: Aug. 26, 2015, 11 pages.

International Preliminary Report on Patentability for International Patent Application No. PCT/US2015/046834, date of mailing Aug. 2, 2016, date of filing: Aug. 26, 2015, 9 pages.

* cited by examiner

SHARING CONTENT WITH PERMISSION CONTROL USING NEAR FIELD COMMUNICATION

BACKGROUND

Computer systems are currently in wide use. Some such computer systems allow users to create and edit content.

By way of example, some computer systems include word processing systems, spreadsheet systems, and presentation systems, among others. All of these systems include functionality that allows a user to create content, such as word processing documents, spreadsheet documents, presentation documents (e.g., slide shows), etc.

Document management systems allow users to manage documents. For instance, a document management system can provide storage that allows a user to store a document. It can also provide processors or servers that can be used to run the document creation and editing software. By way of example, some document management systems include processors or servers that host word processing applications, spreadsheet applications, presentation applications, etc. Thus, a user that has the location of a document that is stored on the document management system can access the document management system to run a corresponding application in order to view, modify or perform other operations on, a corresponding document.

Document management systems often also have permission components. Various documents can have permissions associated with them that define the various levels of access that users or groups have to a given document. The permission component enforces those permissions. For instance, the permissions associated with a given document may identify users or groups that have read or write access to the document. They may also identify users or groups that do not have access to the documents.

Mobile devices are also currently in wide use. Some mobile devices include such devices as mobile phones, smart phones, tablet computers, among others. Mobile devices can currently communicate with one another using near field communication. Some systems also allow users to share documents or other content using near field communication. For instance, some technology allows users to "tap and send" content. A sending user (who is sending content) brings his or her mobile device into contact with (or into close proximity of) a receiving user's mobile device. This actuates functionality on the sender's device that sends a selected document (or other content that is selected in other ways) to the receiver's device over a near field communication link that has been established between the two devices.

The discussion above is merely provided for general background information and is not intended to be used as an aid in determining the scope of the claimed subject matter.

SUMMARY

A sending device receives a user input indicating that the user wishes to share and open item of content with a receiving device. A near field communication link is opened between the sending device and the receiving device. Metadata for sharing the open data is gathered on the sending device and a permission setting user interface display is displayed, with a user input mechanism that allows a user to set permissions corresponding to the open item. User actuation of the permission setting user input mechanism is received, the permissions are added to the open item, and the metadata is sent to the receiving device over the near field communication link. The metadata includes a location of the open item. The open item can then be accessed by the receiving device, with the permissions applied to the open item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
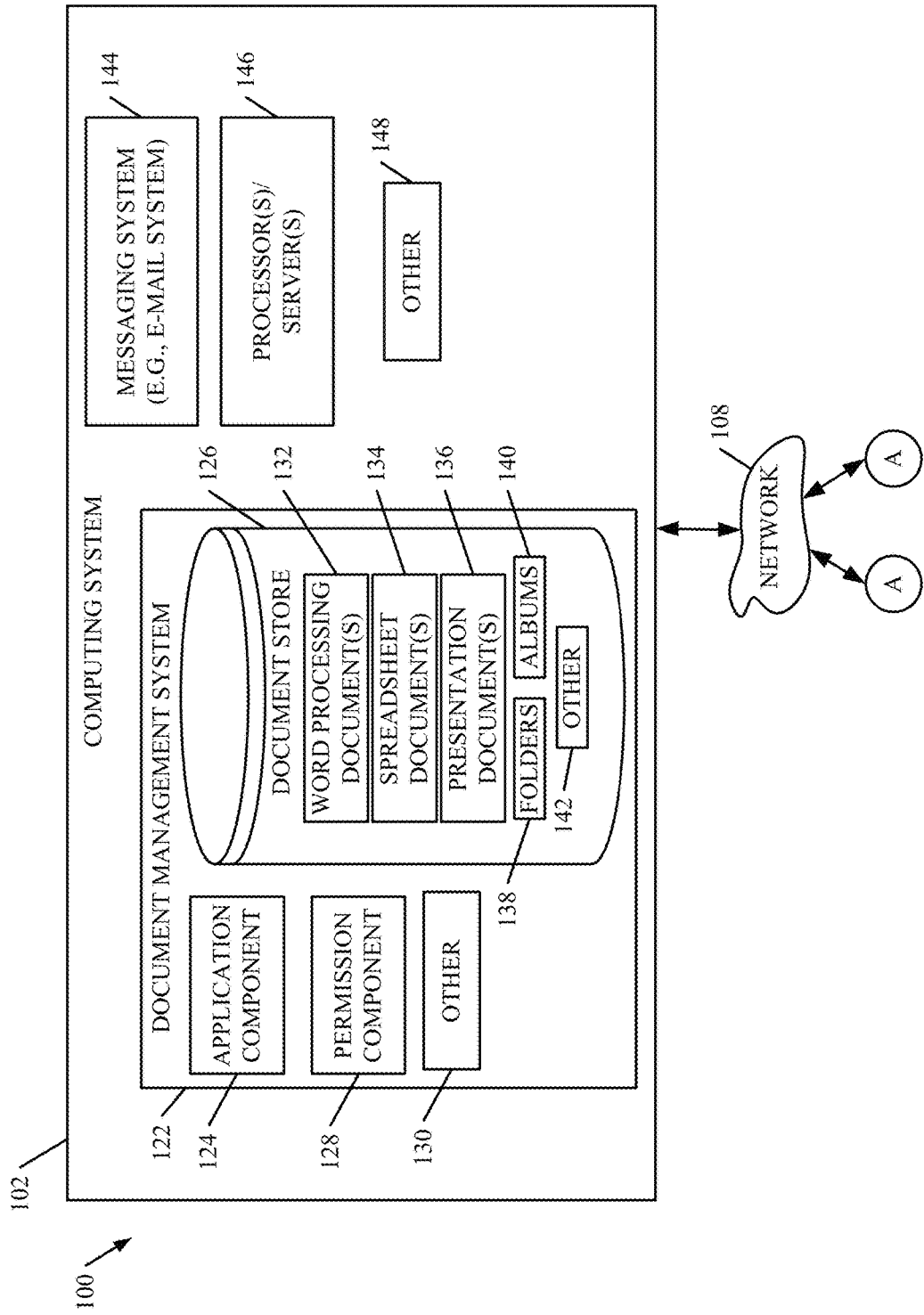
FIGS. 1A and 1B (collectively referred to as FIG. 1) show a block diagram of one example of a content sharing architecture.
Figure 1B:
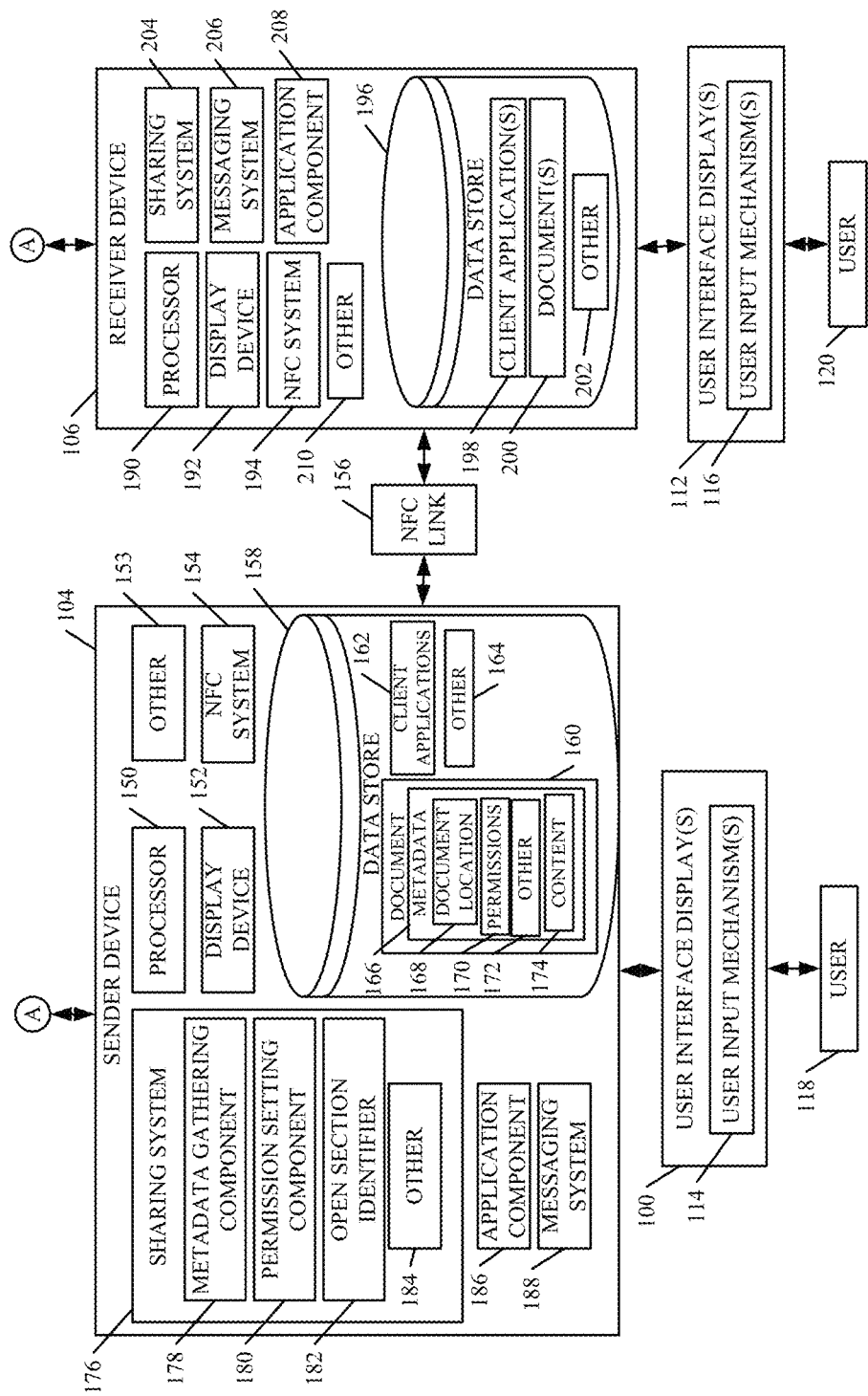

FIGS. 1A and 1B (collectively referred to as FIG. 1) show a block diagram of one example of a content sharing architecture 100. Content sharing architecture 100 illustratively includes computing system (or remote server system) 102, sender device 104 and receiver device 106. Devices 104 and 106 illustratively communicate with computing system 102 over network 108. Network 108 can be a cellular network, a wide area network, a local area network, or another network. In the example shown in FIG. 1, devices 104 and 106 illustratively generate user interface displays 110-112, with user input mechanisms 114-116, for interaction by users 118-120. Users 118-120 illustratively interact with user input mechanisms 114-116 to control and manipulate the corresponding devices 104 and 106. Users 118-120 can also illustratively control their corresponding devices 104-106 to access information in, and otherwise control and manipulate, computing system 102.

In the example shown in FIG. 1, computing system 102 illustratively includes document management system 122, which, itself, includes application component 124, document store 126, permission component 128, and it can include other items 130 as well. Document store 126 (in the example shown in FIG. 1) illustratively includes word processing documents 132, spreadsheet documents 134, presentation documents 136, various folders 138, albums (such as picture albums, etc.) 140 and it can include other items 142.

Computing system 102 also illustratively includes messaging system 144, which can be an e-mail system or another messaging system. System 102 also illustratively includes one or more processors or servers 146, and it can include other items 148.

Application component 124 illustratively runs one or more various applications that allow users to create, edit, store, and otherwise interact with various types of content. For instance, application component 124 can run a word processing application that allows a user to interact with word processing documents 132. It can run a spreadsheet application that allows users to interact with spreadsheet documents 134, and it can run a presentation application (such as a slide presentation application) that allows users to interact with presentation documents (such as slide presentations) 136. Further, it can allow users to interact with folders 138, albums 140, and other information 142.

Permission component 128 illustratively enforces permissions associated with the various documents and information in document store 126. This is described in greater detail below.

In the example shown in FIG. 1, sender device 104 illustratively includes processor 150, display device 152 (which can be a monitor, a touch sensitive display, a display on a mobile phone or smart phone or tablet computer, among others). It also includes near field communication system 154 that can be used to establish a near field communication link 156 with receiver device 106. Device 104 also illustratively includes data store 158 that can be used to store documents 160, client applications 162, and other information 164. The documents 160 illustratively include corresponding metadata 166 that can include the document location 168 where document 160 resides, permissions 170 associated with the document, other metadata 172, and document content 174.

Sender device 104 can also include sharing system 176 that, itself, includes metadata gathering component 178, permission setting component 180, open section identifier 182 and it can include other items 184 as well. Device 104 can also include application component 186 that runs client applications 162, or that controls interaction with computing system 102 where computing system 102 is hosting the application that is being used by sender device 104.

Sender device 104 can also include messaging system 188. System 188 can include an e-mail messaging system, a text or SMS messaging system, or a wide variety of other systems.

FIG. 1 also shows that receiver device 106 can include processor 190, display device 192, near field communication system 194, data store 196 (which itself illustratively includes client applications 198, documents 200 and other information 202), sharing system 204, messaging system 206, and application component 208. It can include other items 210 as well.

Before describing the overall operation of architecture 100, in allowing user 118 to share a document (or other content) with user 120, a brief overview will first be provided.

It is first assumed that user 118 has a data item (such as a document 160) open (or otherwise selected) on device 104. It is also assumed that the user 118 wishes to share that document with user 120 of device 106. In that case, user 118 provides an input indicating that the user wishes to share the document. Metadata gathering component 178 gathers metadata, such as the location where the document is stored, the account information for users 118 and 120, among other things. Permission setting component 180 then generates a user interface display with user input mechanisms that allow user 118 to set the permissions (for user 120) associated with the document that is being shared. Open section identifier 182 illustratively identifies the place, within the document to be shared, that user 118 has navigated to on device 104. This can be done so that the receiving user will have the document open to that precise spot. Device 104 then sends the permissions that were set by user 118 to computing system 102, where they are applied to the particular document 160 that is to be shared. NFC system 154 then sends the metadata (e.g., the document location and the location within the document that user 118 has navigated to) to receiver device 106 over NFC link 156. Application component 208 then launches the corresponding client application in order to access the document. The client application can be launched locally on device 106 or hosted, by system 102. Application component 208 then accesses the document, using the document location provided in the metadata sent by sending device 104. Permission component 128 applies the permissions that were set by user 118, and application component 208 opens the document and navigates to the same location, within the document, as user 118. Application component 208 then displays the document to user 120, in the form set by the permissions (e.g., read only, fully editable, etc.). In one example, messaging system 188 can also send receiver 106 a message with a link to the document as well. For instance, messaging system 188 may be an e-mail system that sends an e-mail to receiver device 106 (such as using e-mail system 144 on computing system 102) with a link to the documents for later access by user 120.

Therefore, instead of sending an entire document over NFC link 156, sender device 104 is only sending metadata which is then used by receiver device 106 to access the document in computing system 102.

It will be noted that, in one example, application component 208 on device 106 can run a client application 198 which works with a hosted version of the application run by application component 124 in computing system 102. In another example, the application can be fully run on computing system 102 by application component 124, and simply displayed on the display device 192 of receiver device 106. In another example, the application can be stored in document store 126 on computing system 102 and accessed through an application that is run by application component 208, locally on receiver device 106. All of these architectures, and others, are contemplated herein.

Figure 2A:
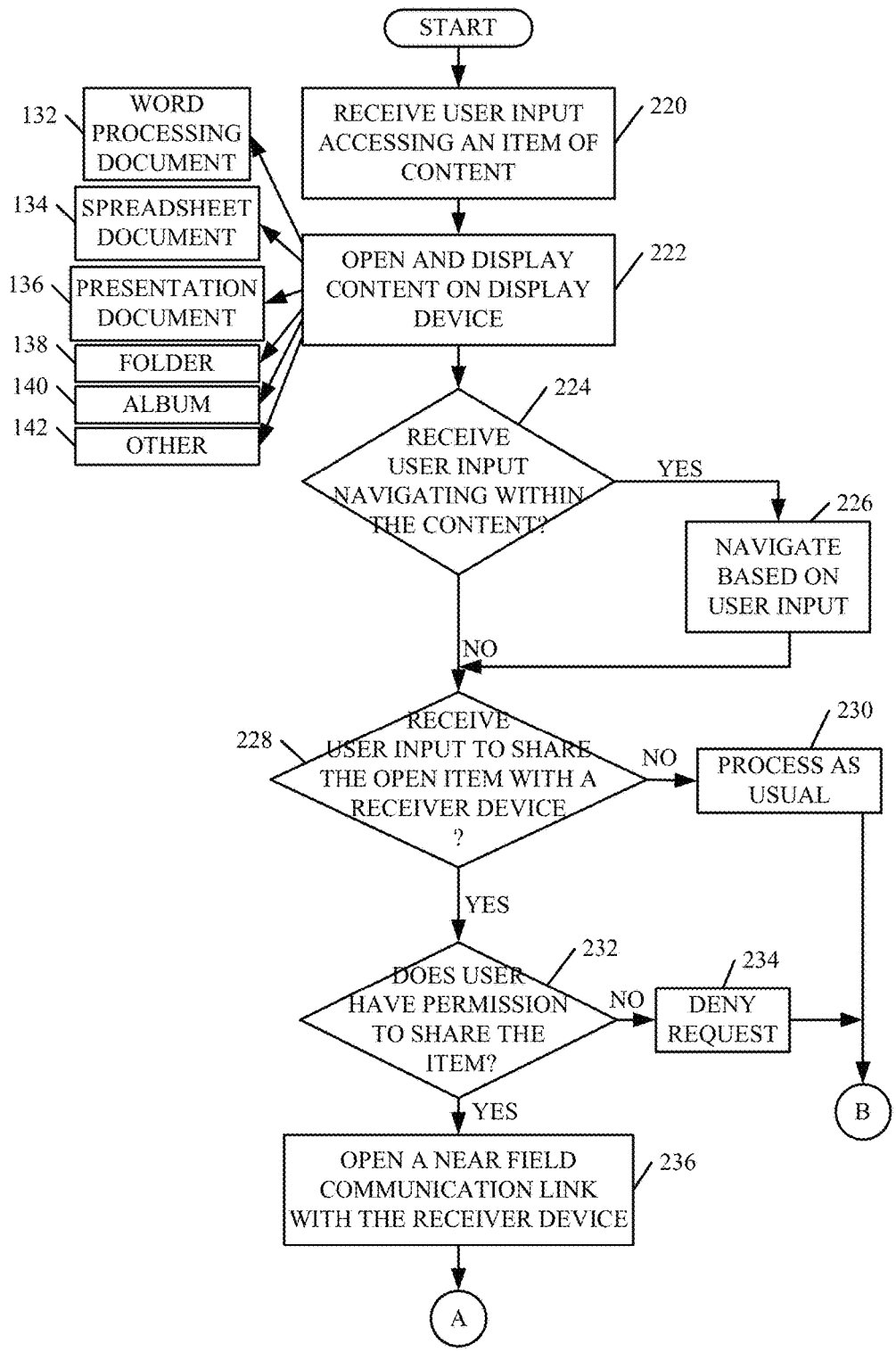
FIGS. 2A and 2B (collectively referred to as FIG. 2) show a flow diagram illustrating one example of the operation of a sending device in allowing a user to set permissions for content to be sent.
Figure 2B:
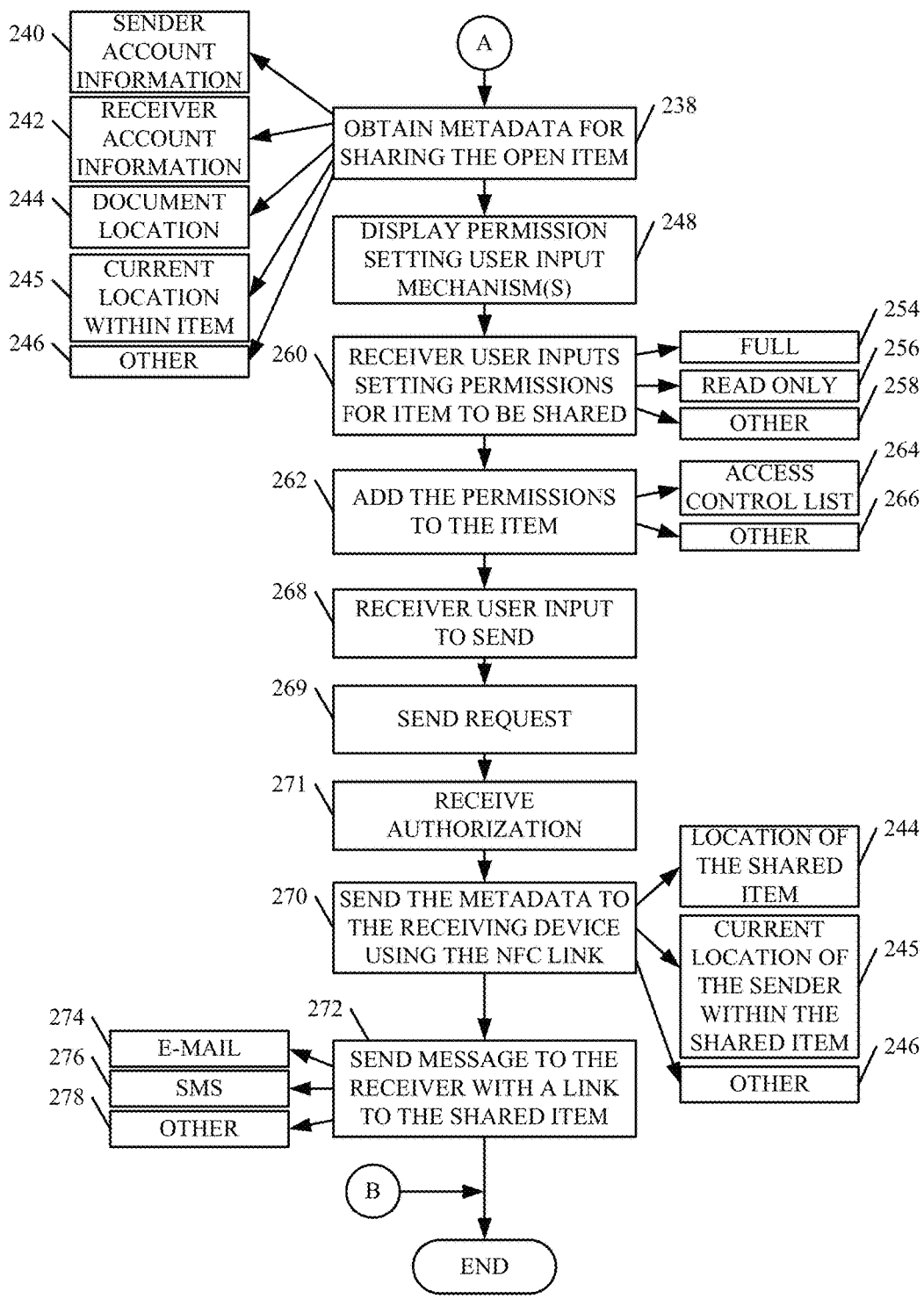

FIGS. 2A and 2B (collectively referred to as FIG. 2) show a flow diagram illustrating one example of the operation of architecture 100. Sender device 104 first receives a user input from user 118, using a suitable user input mechanism, indicating that user 118 wishes to access an item of content (such as a document or another item of content in document store 126 in computing system 102). This is indicated by block 220 in FIG. 2.

The item of content is then opened and displayed on display device 152 of sender device 104. This is indicated by block 222. In one example, the application component 186 downloads a version of the document (such as document 160) and stores it in document store 158 and then launches the corresponding application and displays the document. In another example, application component 124 in computing system 102 launches the application and opens the corresponding document for access by sender device 104. In another example, sender device 104 has a client application that works in conjunction with the hosted application. Of course, the accessed item can be opened and displayed on sender device 104 in other ways as well.

In one example, the item that is displayed is a word processing document 132. In another example it is a spreadsheet document 134. It can also be a presentation document 136, a folder 138, an album (such as a photo album or another album) 140, or it can be another item 142.

User 118 may then provide navigation inputs to the application that is displaying the document, navigating within the document. If so, the application navigates within the document based on the navigation inputs. This is indicated by blocks 224 and 226 in FIG. 2.

Figure 4A:
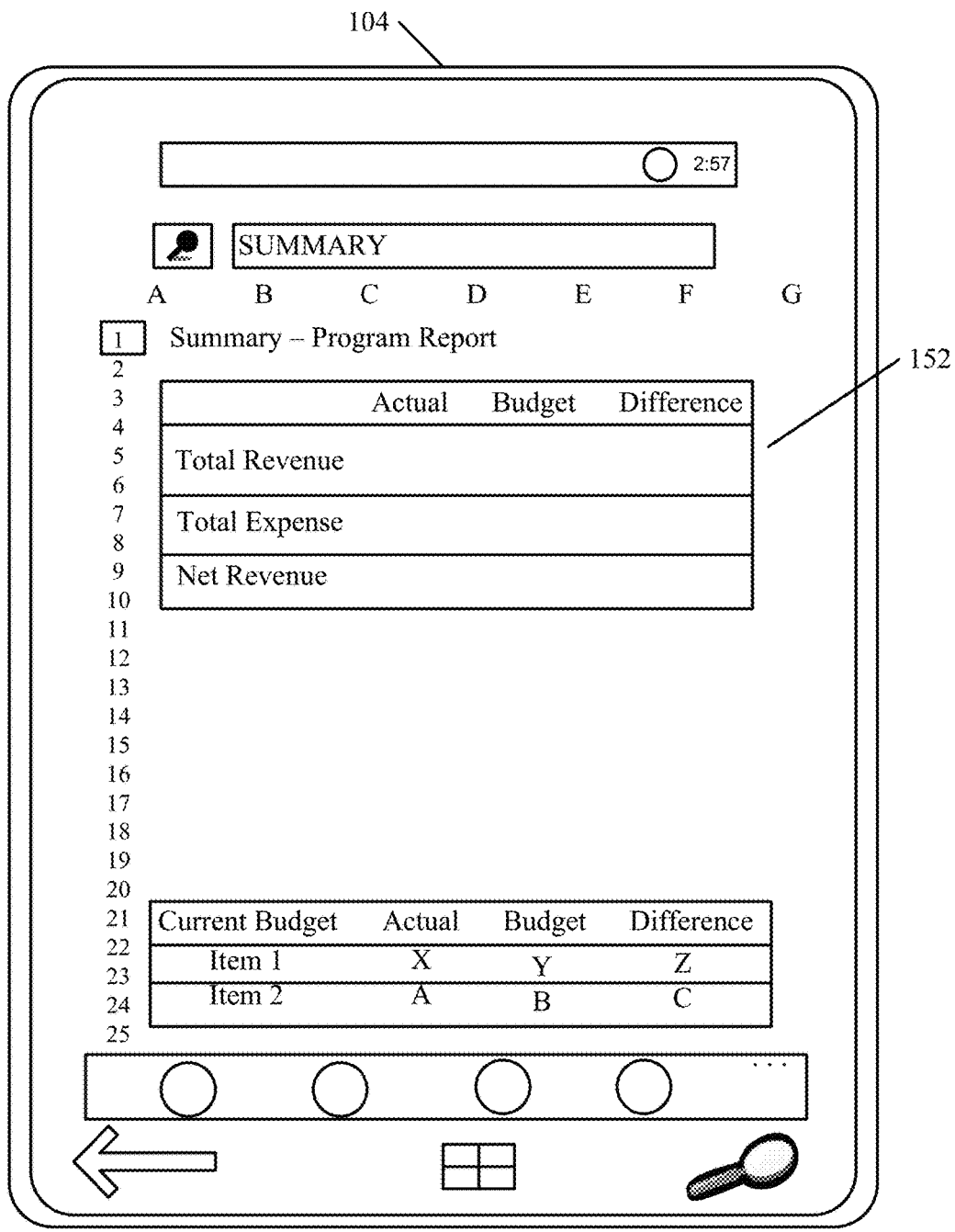
FIGS. 4A-4C show examples of user interface displays.

FIG. 4A shows one example of a user interface display. The sender device 104 in FIG. 4A, is shown as a smart phone. It is displaying an item of content, such as a spreadsheet document, a slide presentation, etc.

In one example, sharing system 176 illustratively receives a user input indicating that user 118 wishes to share the opened item with receiver device 106. If no such input is received, the item is simply processed as usual. This is indicated by blocks 228 and 230.

However, if, at block 228, it is determined that the user has provided such an input, then an indication that the user wishes to share the document is provided to document management system 122. The input can be by actuating a user input mechanism, by inputting a touch gesture, tapping devices 104 and 106 together, etc. In response, permission component 128 determines whether user 118 has permission to share the document. If not, the request to share the document is denied. This is indicated by blocks 232 and 234 in FIG. 2. However, if, at block 232, permission component 128 determines that user 118 does have permission to share the opened item, then NFC system 154 opens an NFC link between sender device 104 and receiver device 106. This can be done using a wide variety of different types of near field communication mechanisms. Opening such a link is indicated by block 236 in FIG. 2.

Metadata gathering component 178 then gathers the metadata that is used for sharing the open item. This is indicated by block 238. As briefly mentioned above, this can include account information for the sender, as indicated by block 240. It can also include account information for the receiver 120, as indicated by block 242. The account information can include user identifying information, such as a user's account identifier, the user's role or security level, as well as user profile information, such as preferences, etc. It can include other information as well. The metadata can include the document location within system 102, where the shared item resides. This is indicated by block 244. It can also include the current location within the item that user 118 is viewing. For instance, open section identifier 182 can determine where the user has navigated to, within the document, and identify that as the current location information. This is indicated by block 244. Metadata gathering component 178 can gather other information as well, as indicated by block 246.

Figure 4B:
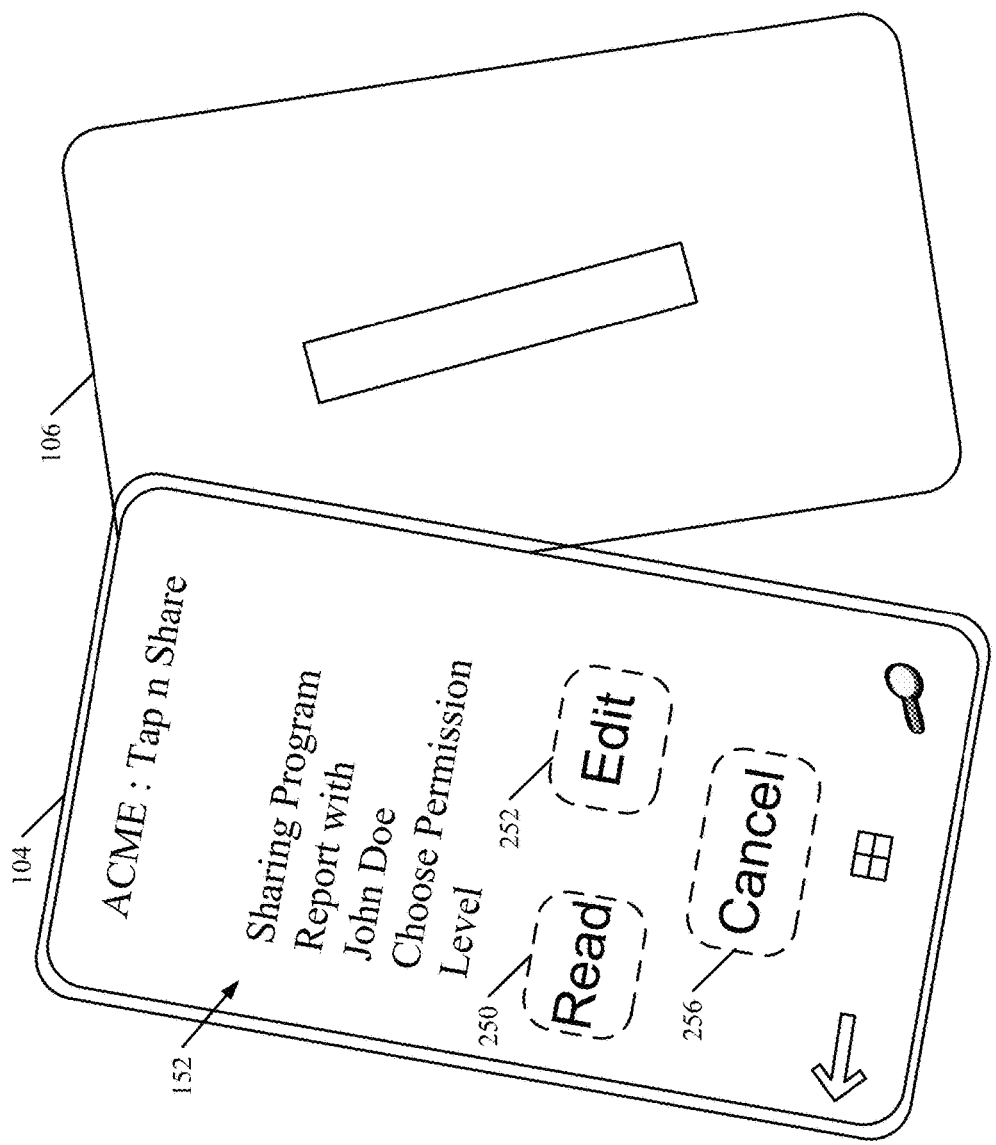

Permission setting component 182 then displays a permission setting user input mechanism that allows user 118 to set permissions on the shared item, for user 120. This is indicated by block 248 in FIG. 2. FIG. 4B shows one example of this. For instance, FIG. 4B shows the mobile device illustrated in FIG. 4A, except that it includes a set of permission setting user input mechanisms 250, 252 and 254. Those mechanisms can be used to set various permission levels for the shared item. For instance, user input mechanism 250 can be actuated to share the item with user 120, but to set a read only permission so that user 120 cannot edit the document. User input mechanism 252 can be actuated to set the permission level for user 120 such that user 120 can fully edit the document.

Receiving the user input setting permissions for the item to be shared is indicated by block 258 in FIG. 2. Providing full edit permissions is indicated by block 254, providing read only permissions is indicated by block 256, and providing other permissions is indicated by block 258.

The permissions are also sent from sender device 104 to permission component 128 in computing system 102. Permission component 128 adds the permissions to the corresponding item that is to be shared. This is indicated by block 262 in FIG. 2. By way of example, permission component 128 can add the permission information to the access control list 164 for the item to be shared. The permissions can be applied to the item in other ways as well, and this is indicated by block 266.

Sharing system 176 can then display a user input mechanism on display device 152 that can be actuated to allow the user to confirm that the user wishes to send or share the item. By way of example, and referring again to FIG. 4B, an additional user input mechanism (not shown) can be actuated by the user to send or share the opened item. User input mechanism 256 can be actuated to cancel the sharing operation. Receiving the user input to confirm sending or sharing the item is indicated by block 268 in FIG. 2.

Also, after receiving the user input to send the shared item, sharing system 176 sends a request to receiver device 106, over NFC link 156 requesting permission to send the shared item to device 106. This is indicated by block 269. Receiver device 106 may (as described in greater detail below with respect to FIG. 3) display an approval user input mechanism for user 120 to authorize reception of the shared item. In any case, for the sake of the present example, sender device 104 illustratively receives authorization to send the shared item. This is indicated by block 271.

Sharing system 176 then sends the gathered metadata to receiving device 106 using the NFC link 156. This is indicated by block 270. Again, the metadata can include the location of the shared item in computing system 102 as indicated by block 244, it can include the current location that the sending user 118 has navigated to, within the shared item, as indicated by block 245, and it can include other metadata 246.

In the example shown in FIG. 2, messaging system 188 also sends a message to the receiver with a link to the shared item, for later use by user 120. This is indicated by block 272. By way of example, messaging system 188 can be an e-mail system and send an e-mail message 174 through messaging system 144 in computing system 102. It can also send an SMS message 276 or another message 278.

Figure 3:
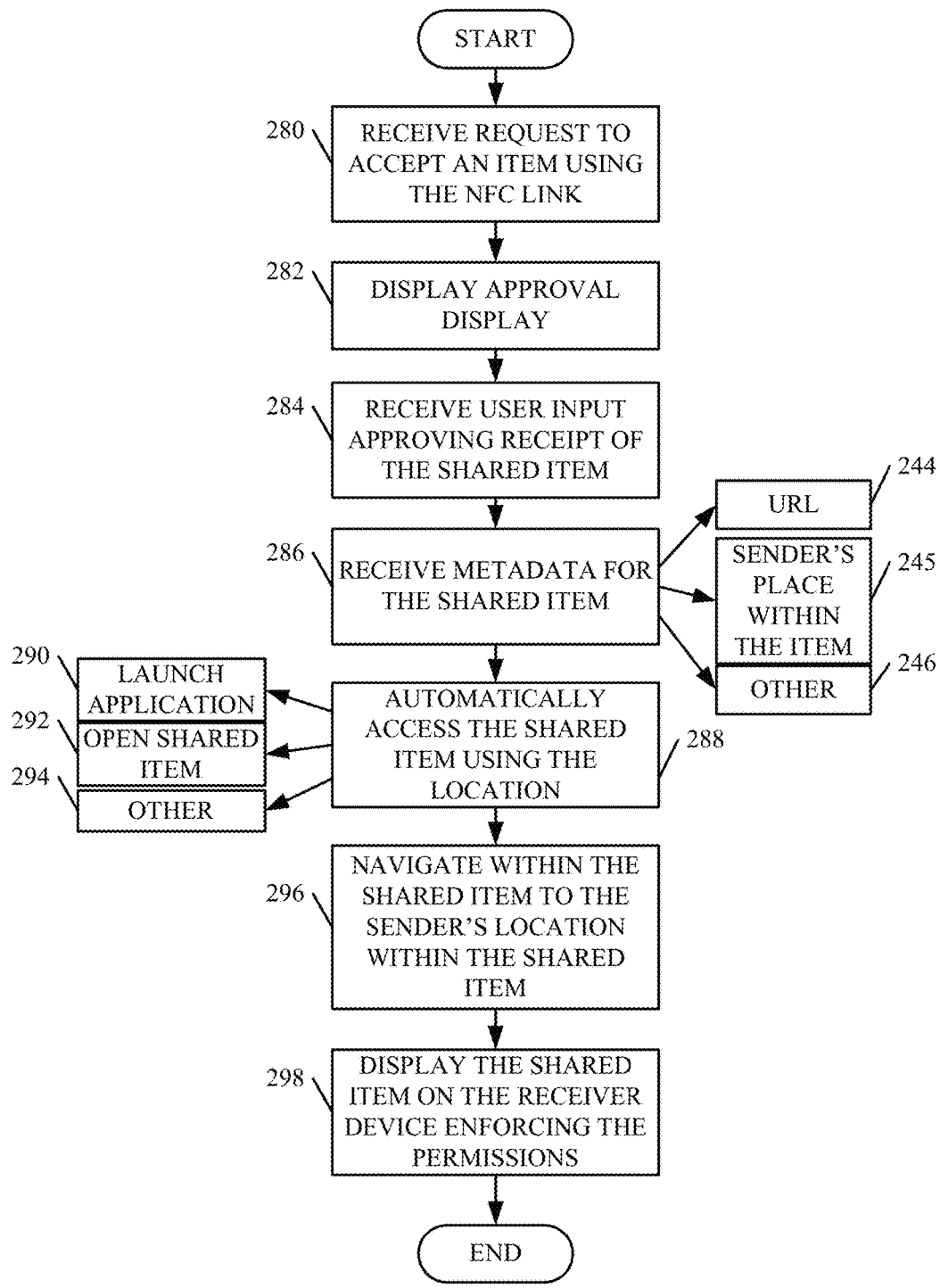
FIG. 3 is a flow diagram illustrating one example of the operation of a receiving device.

FIG. 3 is a flow diagram showing one example of the operation of receiver device 106 in receiving the shared item. In the example shown in FIG. 3, it is assumed that user 118 has already provided an input indicating that the user wishes to share the item with user 120 of receiver device 106.

Device 106 thus receives the request to accept an item using NFC link 156, from sender device 104. Receiving this request is illustrated by block 280 in FIG. 3. In response, sharing system 204 illustratively displays an approval display, with an appropriate user input mechanism, on display device 192. This is indicated by block 282. User 120 can illustratively actuate the user input mechanism to authorize receipt of the shared item from sender device 104. Alternatively, the user can deny this request, in which case the item is not shared. It is assumed that sharing system 204 in receiver device 106 receives the user input approving receipt of the shared item. This is indicated by block 284.

Sharing system 204 thus receives metadata for the shared item. This is indicated by block 286. For instance, the metadata can be a URL or other location information 244 that identifies the location of the shared item in computing system 102. It can also include the information indicative of the sender's current location within the shared item, as indicated by block 245. It can include other metadata 246 as well.

In response, device 106 automatically accesses the shared item using the location information 244. This is indicated by block 288 in FIG. 3. For instance, it can launch a corresponding application on device 106 in order to access the shared item. In another example, it can launch a hosted application on document management system 122, in order to access the document. Launching the application is indicated by block 290. The application illustratively opens the shared item for display on display device 192 of receiver device 106. This is indicated by block 292. The shared item can be accessed in other ways as well, and this is indicated by block 294.

The application then illustratively navigates within the shared item to the sender's location within the shared item, as indicated by metadata 245. Navigating within the shared item to the sender's location is indicated by block 296 in FIG. 3. The shared item is then displayed on display device 192 of receiver device 106, while permission component 128 enforces the permissions that were set by the sending user 118. This is indicated by block 298 in FIG. 3.

Figure 4C:
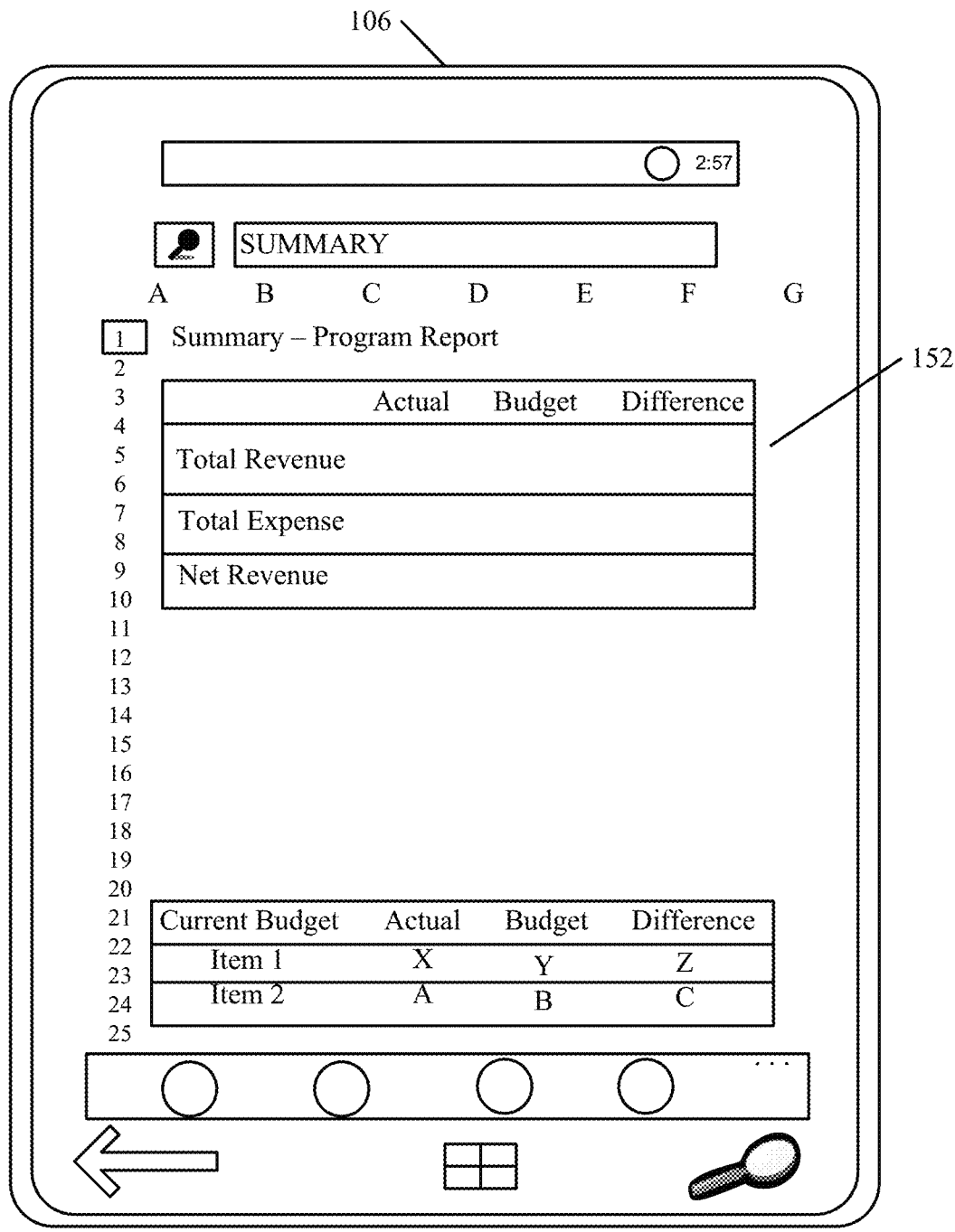

FIG. 4C shows one example of a user interface display that illustrates this. It can be seen, for instance, that the mobile device shown in FIG. 4B (which corresponds to receiver device 106) is now displaying the same document, at the same place, as was the mobile device shown in FIG. 4A (which corresponds to sender device 104) when the user shared the document.

It can thus be seen that the present system does not transfer an entire document using NFC link 156. Instead, it simply transfers metadata over the NFC link and the document can be opened from its original location in computing system 102. This allows a user to quickly share an item, with permission control. Because the document can be opened from its original location in system 102, it need not be sent as a copy of the document from device 104 to device 106. Thus, the receiving user 120 will have access to the latest version of the document. This improves not only the efficiency of the users, but the efficiency of the systems. It allows the receiving user 120 to obtain access to the document much more quickly, instead of having the entire document transferred over link 156. It also allows the receiving user 120 to browse other sections of the document, other than that which is displayed to user 118 on device 104.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
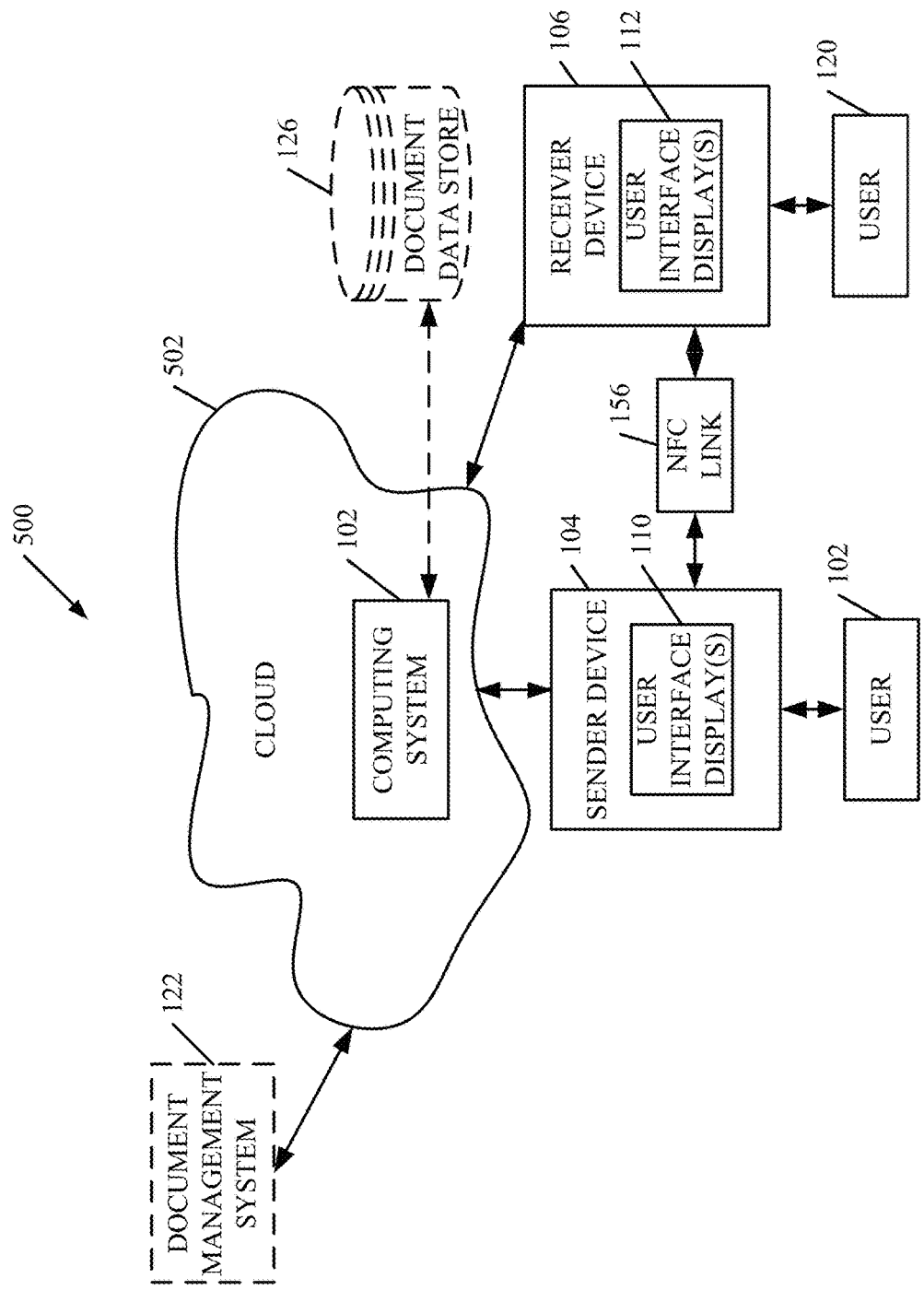
FIG. 5 is a block diagram of one example of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 118 and 120 use user devices 104 and 106 to access those systems through cloud 502.

FIG. 5 also depicts another embodiment of a cloud architecture. FIG. 5 shows that it is also contemplated that some elements of computing system 102 can be disposed in cloud 502 while others are not. By way of example, data store 126 can be disposed outside of cloud 502, and accessed through cloud 502. In another example, document management system 122 can also be outside of cloud 502. Regardless of where they are located, they can be accessed directly by devices 104 and 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
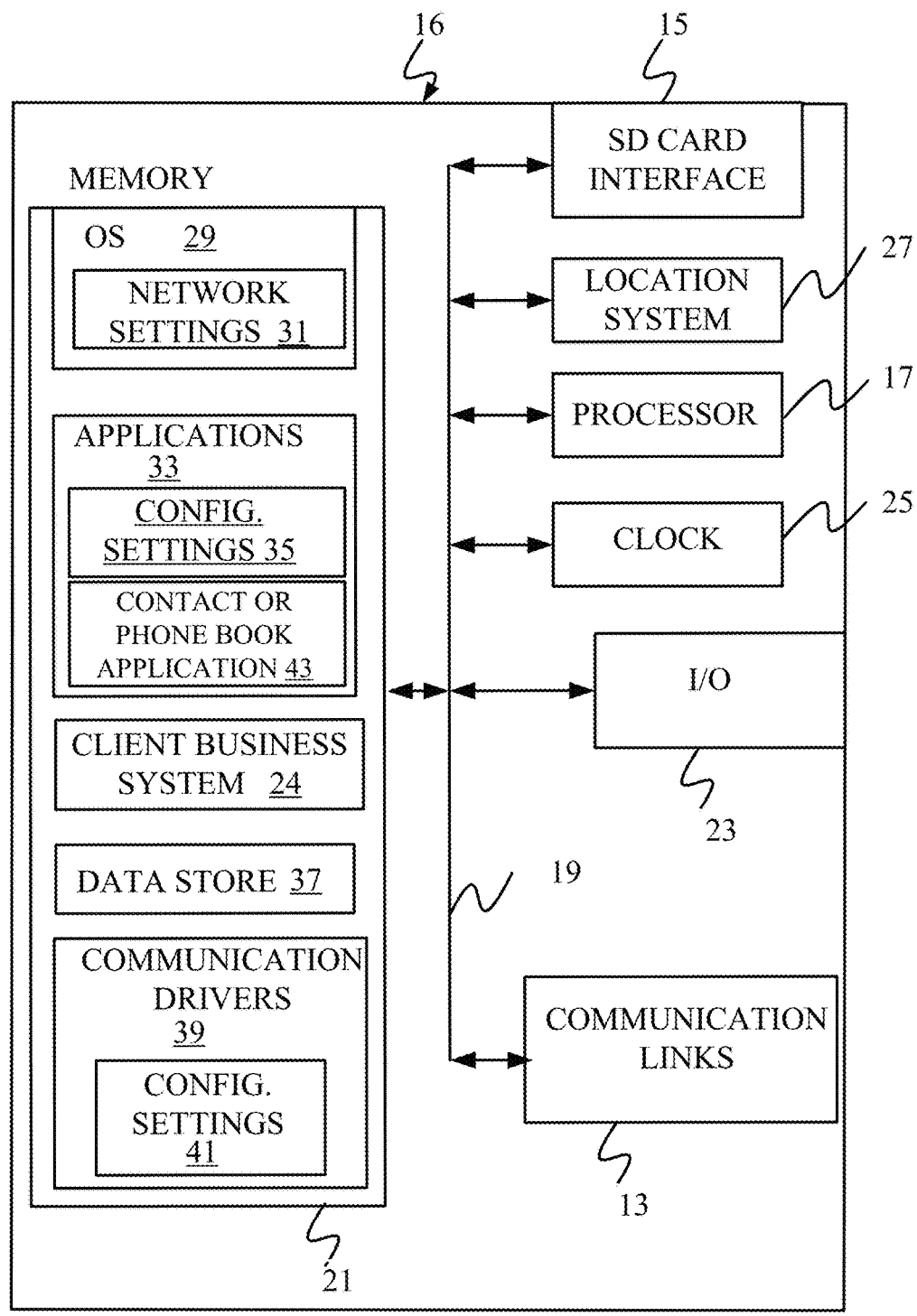
FIGS. 6-8 show various examples of mobile devices.
Figure 7:
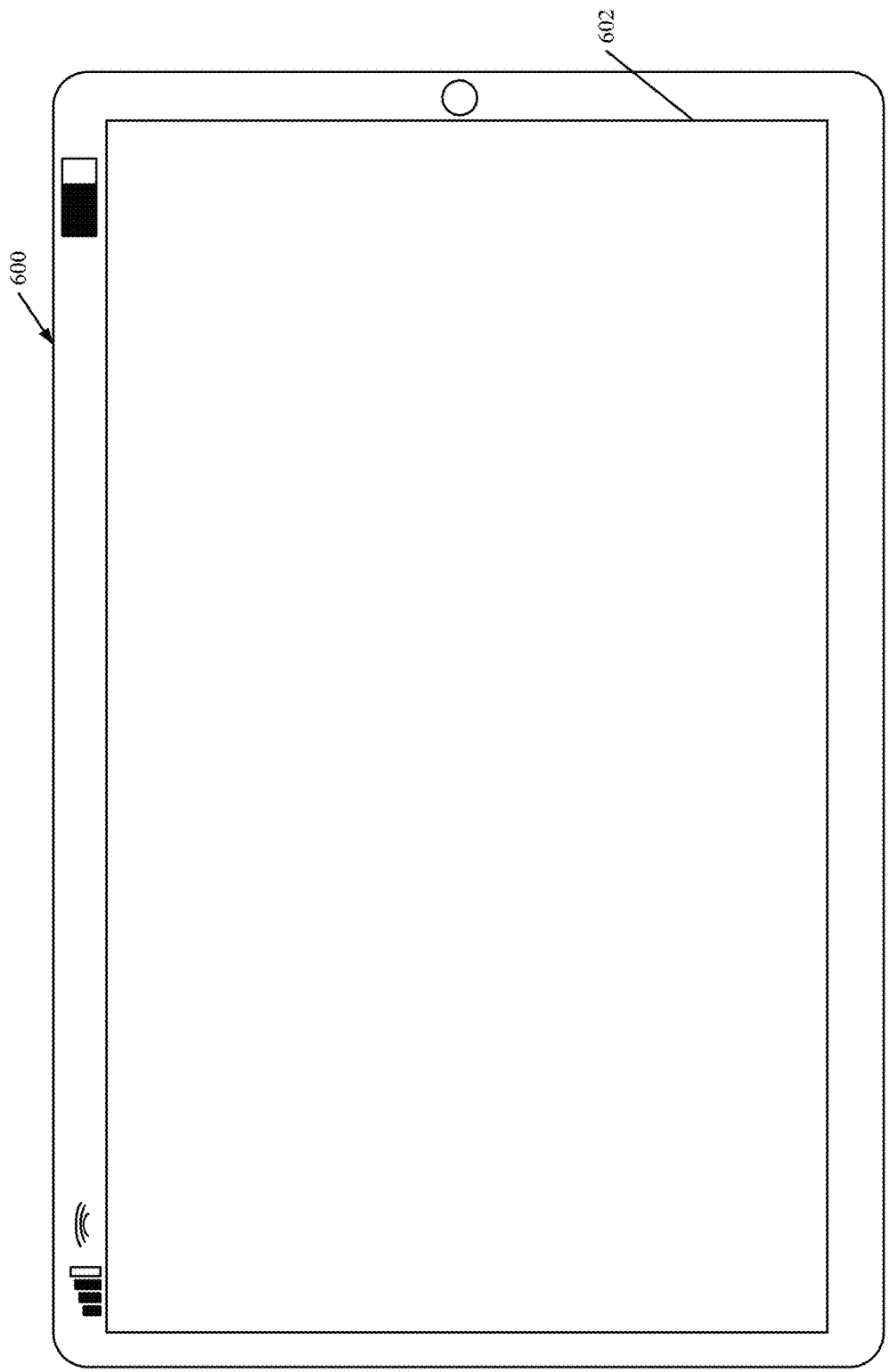
Figure 8:
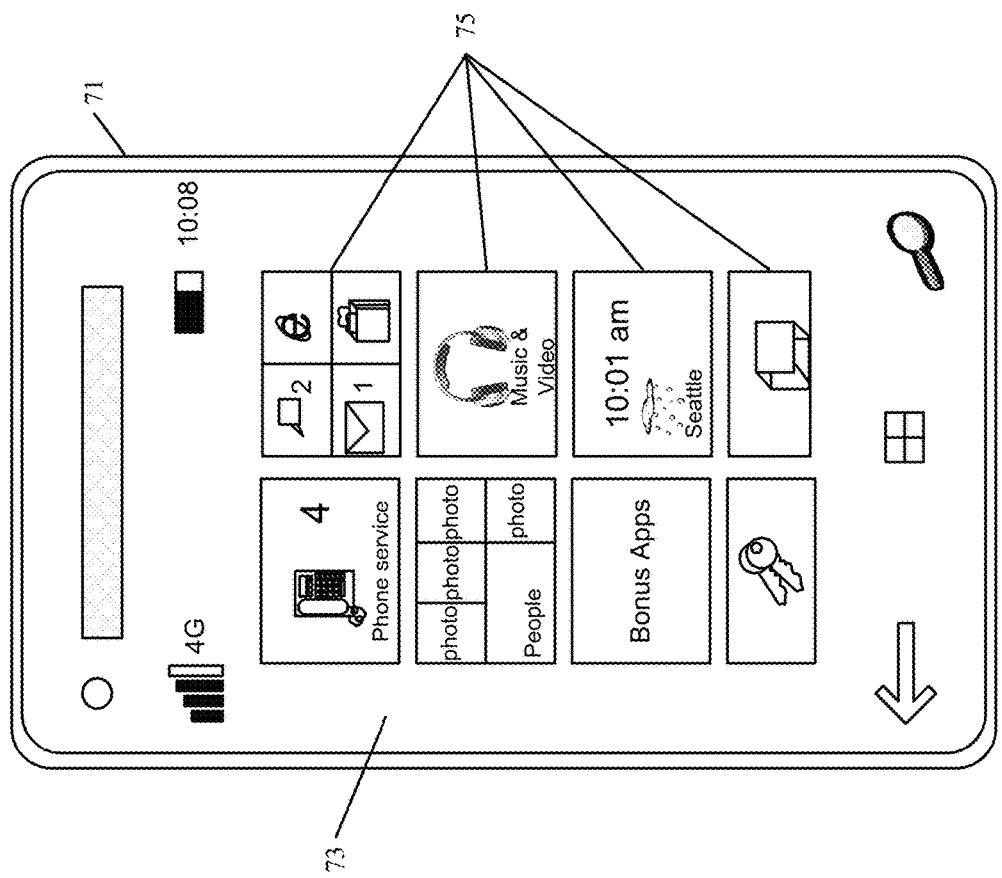

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or that interacts with system 102, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors/servers 146 or those in devices 104 and 106) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone can also includes a Secure Digital (SD) card slot that accepts a SD card.

The mobile device can also be a personal digital assistant (PDA) or a multimedia player or a tablet computing device, etc. (hereinafter referred to as a PDA). The PDA can includes an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons (such as button 65) which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
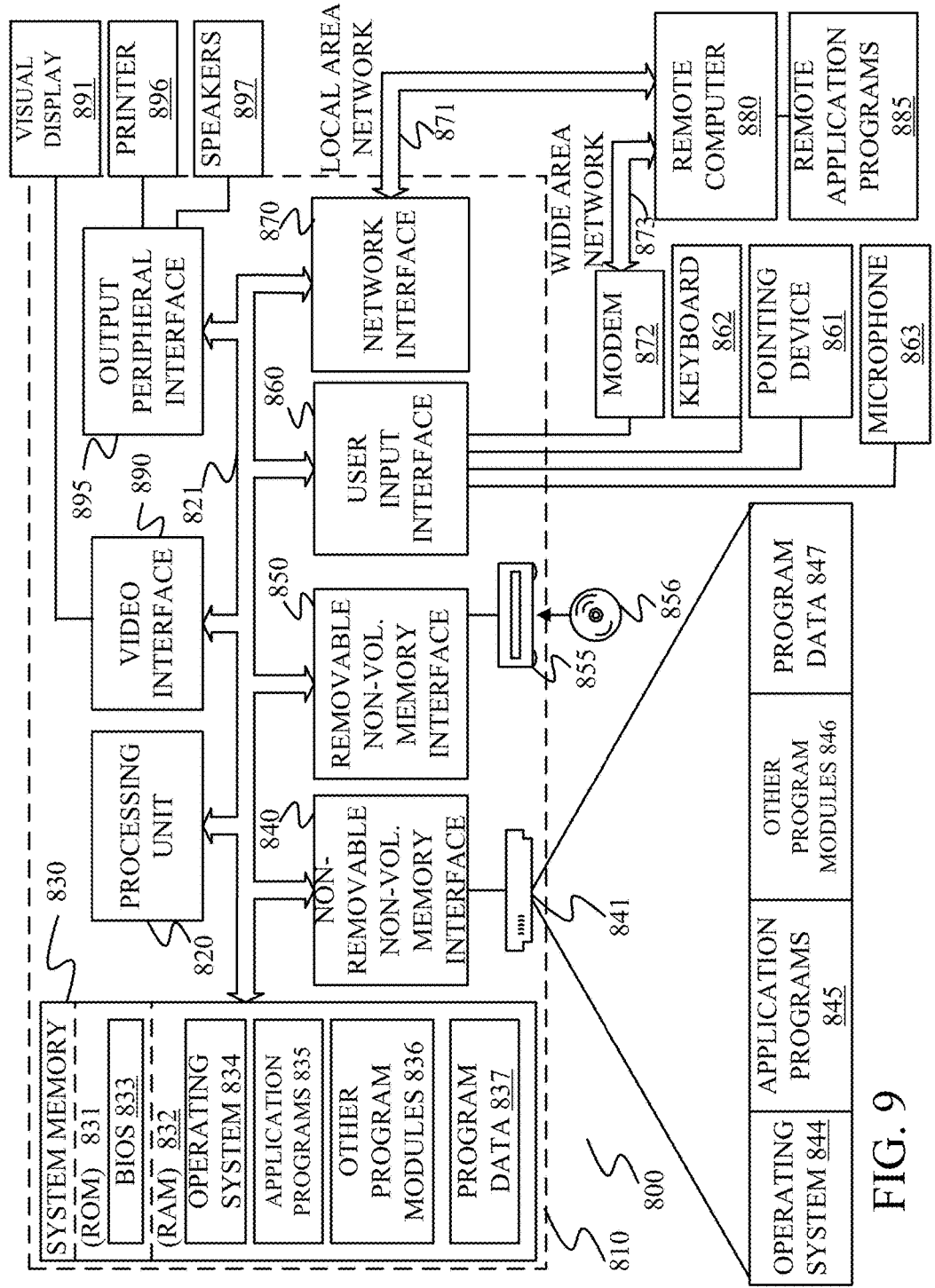
FIG. 9 is a block diagram of one example of a computing environment.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor/servers 146, 150 or 190), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a mobile device, comprising:

a display device an application component that accesses an item from a location in a remote server system and displays the item on the display device;

a metadata gathering system that receives a share user input indicating the item is to be shared with another mobile device and that obtains location metadata that identifies the location of the item in the remote server system;

a permission setting component that generates a permission setting user input mechanism, on the display device, that is actuated to set a permission for the item, relative to a user of the other mobile device, the permission setting component sending the permission to a permission system in the remote server system; and a near field communication system that sends the location of the item in the remote server system to the other mobile device over a near field communication link.

Example 2 is the mobile device of any or all previous examples and further comprising:

an open section identifier that identifies a current location within the item that is currently displayed on the display device, the metadata gathering component obtaining navigation metadata indicative of the current location.

Example 3 is the mobile device of any or all previous examples wherein the near field communication system sends the navigation metadata to the other mobile device over the near field communication link.

Example 4 is the mobile device of any or all previous examples and further comprising:

a messaging system that generates a message including a link to the item in the remote server system and sends the message to the other mobile device.

Example 5 is the mobile device of any or all previous examples wherein the metadata gathering system obtains account metadata indicative of account information for a user of the mobile device and account information for the user of the other mobile device.

Example 6 is the mobile device of any or all previous examples wherein the item comprises a word processing document and wherein the permission setting component generates the permission setting user input mechanism that is actuated to set the permission to a read only permission or an edit permission for the word processing document, relative to the user of the other mobile device.

Example 7 is the mobile device of any or all previous examples wherein the item comprises a spreadsheet document and wherein the permission setting component generates the permission setting user input mechanism that is actuated to set the permission to a read only permission or an edit permission for the spreadsheet document, relative to the user of the other mobile device.

Example 8 is the mobile device of any or all previous examples wherein the item comprises a slide presentation document and wherein the permission setting component generates the permission setting user input mechanism that is actuated to set the permission to a read only permission or an edit permission for the slide presentation document, relative to the user of the other mobile device.

Example 9 is the mobile device of any or all previous examples wherein the item comprises a folder and wherein the permission setting component generates the permission setting user input mechanism that is actuated to set the permission to a read only permission or an edit permission for any other items in the folder, relative to the user of the other mobile device.

Example 10 is the mobile device of any or all previous examples wherein the item comprises an album and wherein the permission setting component generates the permission setting user input mechanism that is actuated to set the permission to a read only permission or an edit permission for any items in the album, relative to the user of the other mobile device.

Example 11 is the mobile device of any or all previous examples and further comprising:

a sharing system that, in response to the share user input, uses the near field communication system to send a request to the other mobile device, requesting permission to share the item, that receives a response from the other mobile device, and that controls whether the item is shared based on the response.

Example 12 is a mobile device, comprising:

a display device;

a near field communication system that communicates with another mobile device over a near field communication link;

a sharing system that receives location metadata from another mobile device over the near field communication link, the location metadata being indicative of a location of an item to be shared in a remote server system; and an application component that accesses the item to be shared from the location in the remote server system, based on the location metadata, and displays the item on the display device.

Example 13 is the mobile device of any or all previous examples wherein the application component accesses the item to be shared and displays the item to be shared with functionality that is identified based on permissions set with the other mobile device.

Example 14 is the mobile device of any or all previous examples wherein the sharing system receives navigation metadata from the other mobile device over the near field communication link, the navigation metadata being indicative of a location within the item to be shared identified on the other mobile device and wherein the application component navigates within the item to be shared to a portion of the item to be shared, based on the navigation metadata, and displays the portion of the item.

Example 15 is a method, comprising:

receiving a share user input at a first mobile device;

identifying a location within a remote server system, with the first mobile device, where a shared item is stored;

displaying a permission setting user input mechanism on the first mobile device;

receiving actuation of the permission setting user input mechanism indicative of a permission corresponding to the shared item, relative to a user of a second mobile device, with which the shared item is to be shared;

sending the permission from the first mobile device to the remote server system for application to the shared item; and sending the location where the shared item is stored from the first mobile device to the second mobile device over a near field communication link.

Example 16 is the method of any or all previous examples and further comprising:

sending a message from the first mobile device to the second mobile device that includes a link to the shared item in the remote server system.

Example 17 is the method of any or all previous examples and further comprising:

identifying a location within the shared item to which the first mobile device has navigated; and sending the location within the shared item to the second mobile device over the near field communication link.

Example 18 is the method of any or all previous examples and further comprising:

prior to sending the location where the shared item is stored from the first mobile device to the second mobile device over the near field communication link, sending a request to share the shared item, from the first mobile device to the second mobile device over the near field communication link;

receiving a response from the second mobile device; and controlling whether the location where the shared item is stored is sent to the second mobile device based on the response received from the second mobile device.

Example 19 is the method of any or all previous examples wherein displaying a permission setting user input mechanism comprises:

displaying a plurality of different permission user input mechanisms, each corresponding to a different permission to be applied to the shared item, relative to the user of the second mobile device.

Example 20 is the method of any or all previous examples wherein displaying a plurality of different permission user input mechanisms comprises:

displaying a read only permission user input mechanism that is actuated to apply a read only permission to the shared item, relative to the user of the second mobile device; and displaying an edit permission user input mechanism that is actuated to apply an edit permission to the shared item, relative to the user of the second mobile device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
a display device;
at least one processor; and
memory storing instructions executable by the at least one processor, wherein the instructions, when executed, provide:
an application component configured to access an item from a location in a remote server system and display the item on the display device;
an open section identifier component configured to identify a current location, within the item, that is currently displayed on the display device;
a metadata gathering system configured to:
receive a share user input indicating the item is to be shared with another mobile device;
obtain location metadata that identifies the location of the item in the remote server system; and
obtain navigation metadata indicative of the current location; and
a permission setting component configured to:
generate a permission setting user input mechanism, on the display device, that is actuated to set a permission for the item, wherein the permission setting user input mechanism displays a plurality of different permission levels, each permission level defining a different level of user access relative to a user of the other mobile device;
receive a user input through the permission setting user input mechanism, the user input selecting one of the plurality of different permission levels; and
send an indication of the selected permission level to a permission system in the remote server system; and
a near field communication system configured to:
send the location of the item in the remote server system to the other mobile device over a near field communication link; and
send the navigation metadata to the other mobile device over the near field communication link.

2. The mobile device of claim 1 wherein the remote server system is configured to share the item to the other mobile device with functionality that is identified based on the selected permission level.

3. The mobile device of claim 1, wherein the instructions, when executed, provide:
a messaging system configured to generate a message including a link to the item in the remote server system and send the message to the other mobile device.

4. The mobile device of claim 1 wherein the metadata gathering system is configured to obtain account metadata indicative of account information for a user of the mobile device and account information for the user of the other mobile device.

5. The mobile device of claim 1 wherein the item comprises a word processing document and wherein the permission setting component is configured to generate the permission setting user input mechanism that is actuated to set the permission to a read only permission or an edit permission for the word processing document, relative to the user of the other mobile device.

6. The mobile device of claim 1 wherein the item comprises a spreadsheet document and wherein the permission setting component is configured to generate the permission setting user input mechanism that is actuated to set the permission to a read only permission or an edit permission for the spreadsheet document, relative to the user of the other mobile device.

7. The mobile device of claim 1 wherein the item comprises a slide presentation document and wherein the permission setting component is configured to generate the permission setting user input mechanism that is actuated to set the permission to a read only permission or an edit permission for the slide presentation document, relative to the user of the other mobile device.

8. The mobile device of claim 1 wherein the item comprises a folder and wherein the permission setting component is configured to generate the permission setting user input mechanism that is actuated to set the permission to a read only permission or an edit permission for any other items in the folder, relative to the user of the other mobile device.

9. The mobile device of claim 1 wherein the item comprises an album and wherein the permission setting component is configured to generate the permission setting user input mechanism that is actuated to set the permission to a read only permission or an edit permission for any items in the album, relative to the user of the other mobile device.

10. The mobile device of claim 1, wherein the instructions, when executed, provide:
a sharing system configured to, in response to the share user input, use the near field communication system to send a request to the other mobile device, requesting permission to share the item, that receives a response from the other mobile device, and that controls whether the item is shared based on the response.

11. A mobile device, comprising:
a display device;
at least one processor; and
memory storing instructions executable by the at least one processor, wherein the instructions, when executed, provide:
an application component configured to access an item from a location in a remote server system and display the item on the display device; and
a sharing system configured to:
receive a share user input indicating the item is to be shared with another mobile device;
obtain location metadata that identifies the location of the item in the remote server system;
identify a current location, within the item, that is currently displayed on the display device;
obtain navigation metadata indicative of the current location;
generate a permission setting user input mechanism, on the display device, that displays a plurality of different permission levels, each permission level defining a different level of user access relative to a user of the other mobile device;
receive a user input through the permission setting user input mechanism, the user input selecting one of the plurality of different permission levels; and
send an indication of the selected permission level to a permission system in the remote server system;
a near field communication system configured to
send the location of the item in the remote server system to the other mobile device over a near field communication link; and
send the navigation metadata to the other mobile device over the near field communication link.

12. The mobile device of claim 11 wherein the remote server system is configured to share the item to the other mobile device with functionality that is identified based on the selected permission level.

13. A method, comprising:
identifying, by a first mobile device, a shared item that is stored on a remote server system that is remote from the first mobile device;
after identifying the shared item that is stored on a remote server system, receiving a share user input at the first mobile device, the share user input being indicative of a request to share the shared item with a user of a second mobile device;
identifying, by the first mobile device a location within the remote server system where the shared item is stored;
identifying a current location within the shared item to which the first mobile device has navigated;
displaying a plurality of different permission setting user input mechanisms on the first mobile device, each corresponding to a different permission level to be applied to the shared item, relative to the user of the second mobile device;
receiving actuation of one of the permission setting user input mechanisms indicative of a selected permission level corresponding to the shared item;
sending an indication of the selected permission level from the first mobile device to the remote server system for application to the shared item;
sending the location where the shared item is stored from the first mobile device to the second mobile device over a near field communication link; and
sending the current location within the shared item to the second mobile device over the near field communication link.

14. The method of claim 13 and further comprising:
sending a message from the first mobile device to the second mobile device that includes a link to the shared item in the remote server system.

15. The method of claim 13 and further comprising:
prior to sending the location where the shared item is stored from the first mobile device to the second mobile device over the near field communication link, sending a request to share the shared item, from the first mobile device to the second mobile device over the near field communication link;
receiving a response from the second mobile device; and
controlling whether the location where the shared item is stored is sent to the second mobile device based on the response received from the second mobile device.

16. The method of claim 13 wherein displaying a plurality of different permission user input mechanisms comprises:
displaying a read only permission user input mechanism that is actuated to apply a read only permission to the shared item, relative to the user of the second mobile device; and
displaying an edit permission user input mechanism that is actuated to apply an edit permission to the shared item, relative to the user of the second mobile device.

* * * * *